April 3, 1951 A. HENDERSON 2,547,321
FLANGED COUPLING SEAL
Filed Aug. 20, 1947
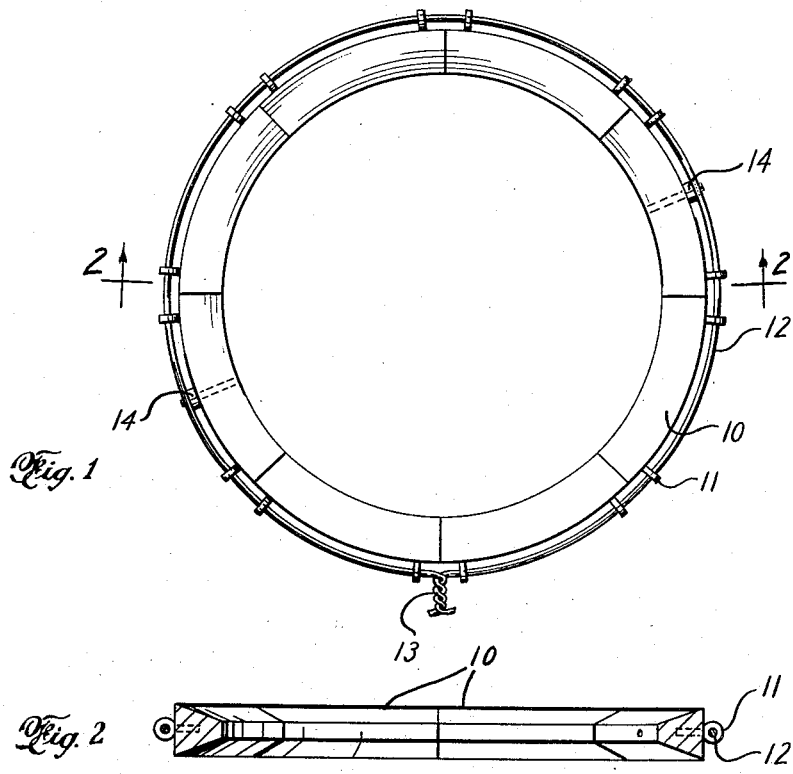
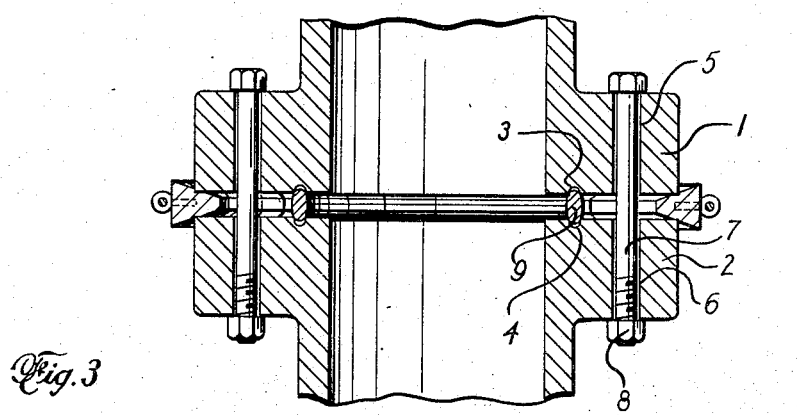
Adam Henderson
INVENTOR.
BY
ATTORNEYS Patented Apr. 3, 1951

2,547,321

UNITED STATES PATENT OFFICE 2,547,321

FLANGED COUPLING SEAL

Adam Henderson, Houston, Tex.

Application August 20, 1947, Serial No. 769,707

2 Claims. (Cl. 285—130)

This invention relates to flanged coupling seals and has for its general object the provision of a device and method of employing the same whereby the space between the flanges of a flanged coupling and the intermediate portions of the bolts or other means for securing the flanges together may be protected.

Flanged couplings between sections of pipes or between pipes and various fittings and vessels used in connection therewith are well-known and widely employed, and have been found to be a highly satisfactory means of joining such parts together where the surface in which they are to be employed is under high pressure or exposed to severe treatment of any kind. However, it is a well-known fact that when such couplings are employed in the presence of a corrosive atmosphere or in the presence of other deleterious substances the same will get into the spaces between the flanges and cause corrosion or other deterioration not only of the flanges themselves but of the sealing means between the flanges and of the bolts or other securing means for holding the flanges together. Such deterioration is particularly marked in instances where such couplings are employed near salt water or in chemical plants and the like.

More specifically therefore it is an object of the present invention to provide a means for effectively closing the space between the flanges of flanged couplings against the entrance of deleterious substances.

Another object of this invention is to provide a means for effecting such a seal which will not employ fibrous or plastic gaskets.

Another object is to provide a means for effecting such a seal which may be put in place with ease by one person.

Another object of this invention is to provide a means for effecting such a seal which may be caused to effect the seal in segmental steps without the use of any special tools.

Another object is to provide such a means in combination with a means for completely filling the sealed off space with a protective non-corrosive material.

Other objects and advantages of this invention will become apparent from the following description taken in connection with the accompanying drawings wherein is set forth by illustration one embodiment of the invention.

In the drawings:

Fig. 1 is an elevation of an assembled protective device constructed in accordance with this invention.

Fig. 2 shows a cross-section taken along the line 2—2 of Fig. 1.

Fig. 3 is a longitudinal cross-section through a flanged joint with the device illustrated in Figs. 1 and 2 in operative sealing position thereon.

Referring more in detail to the drawings, the joint illustrated in Fig. 3 is shown more or less diagrammatically and consists of two opposed flanges 1 and 2 having their adjacent faces provided with sealing ring receiving grooves 3 and 4 respectively. The flanges themselves are provided with registering axial openings or holes 5 and 6 respectively adapted to receive bolts 7 or the like which taken with the nuts 8 serve to secure the flanges to each other. A seal is effected between the flanges by means of a conventional metal sealing ring 9 having opposite parts fitting into the grooves 3 and 4 respectively.

In accordance with this invention there are provided a plurality of segmental sealing members or blocks 10, each of wedge-shaped cross section as best shown in Fig. 2. These blocks or segments are of such extent and number as taken together will provide a complete circle and are preferably formed with eyelets 11 or other suitable means on their outer peripheries for receiving a cable or other tension member 12. These members 11 are preferably in the form of complete eyelets so that the segments may all be held by one tension member and put in place simultaneously, but if desired, guides may be provided in place of these eyelets which are not completely closed about the tension member, thereby making it possible to put the segments in place individually after the ends of the tension member have been brought together.

The wedge-shaped cross-section of these segments is made so that it tapers toward the center of the complete circle of segments as shown in Fig. 2 and the segments themselves are preferably made of some material not readily susceptible to corrosion or decay but preferably soft enough and malleable enough so that they may readily be forced into sealing engagement with the respective flanges of the flanged joint when the inner extremities of the segments are placed between such flanges and the segments forced radially inwardly. Thus, if the flanges are made of iron or steel as is common, suitable materials for such segments would be lead, babbitt, type metal, bronze or copper. The eyelets on the various segments may be made integral with the segments of the same material or may be made of stronger material with parts embedded in or otherwise secured to the bodies of the segments.

It will be appreciated that a set of such segments may readily be put in place around a flanged joint by one person even though the joint be on a vertical axis. Thus, a person can put the segments in place one at a time and by tapping each segment with a hammer or the like may drive it into the space between the flanges so that it will stay in place while the other segments are being put in. After all segments have been put in place the cable 12 or other tension member may be tightened by twisting the ends together as shown at 13 or in any other suitable manner and will thereafter serve to hold all of the segments in place.

It is desirable not only that the space between such flanges be closed to prevent the entrance of deleterious matter but also that the space be completely filled with a protective material such as a lubricant or a plastic which will assist in the prevention of the entrance of deleterious matter and will provide a protective coating for the surfaces between the flanges. To this end it is preferred that one or more of the segments be provided with a lubricant fitting 14 so that a protective fluid may be injected into the space between the flanges until such space is completely filled.

It is thought that the operation of this invention will be clear from the foregoing description but it may be stated that in the use of the device the segments are preferably all strung on and held by a member such as the cable 12 which is swung around the flanged joint whereupon the cable 12 or the like is joined together at its ends and partially tightened but not sufficiently tightened to close all of the small openings between the segments.

Plastic or lubricant in fluid form is then injected through one or more of the fittings 14 and as the space between the flanges becomes filled, this material will tend to ooze out between the segments. Preferably the segments adjacent the lubricant fittings will be tapped with a hammer or otherwise forced more tightly into place until they seal tightly against each other and against the flanges and the oozing between them ceases. This tapping is carried on progressively on the next adjacent segments, etc. until all of the segments have been tightened so that there is no further oozing of the material, the last segments tightened being those most remote from the lubricant fittings. The cable 12 or the like may be tightened during this process or afterwards so as to hold all segments tightly in place. Also, if desired all the segments may be additionally tapped or hammered so as to insure a perfect seal between each segment and the adjacent flanges and other adjacent segments.

Thus, it will be seen that the space between the flanges may not only be sealed but by virtue of the progressive forcing of the segments into place during the injection of a lubricant or plastic protective material all of the air will be displaced from between the flanges by such lubricant or plastic.

In view of the relatively soft nature of the material of the segments, a sealing engagement may at any time be secured or renewed by hammering or caulking them into the opening between the flanges.

It will be apparent that there is no material such as fiber or other readily destructible material in the form of gaskets or otherwise incorporated into the device just described and that this device is fully capable of carrying out and accomplishing all of the objects and advantages sought by this invention.

Having described my invention, I claim:

1. In combination, a flanged joint formed by a pair of connected flanged elements having a sealing ring therebetween whereby the abutting faces of said flanges are spaced apart from each other to provide an annular space circumferentially around the ring, and a plurality of arcuate segments of malleable material engaged within the outer portion of said annular space, with each end of each segment having sealing contact with the end of the adjacent segment whereby said segments co-act with each other to completely close the annular space, each segment being wedge-shaped in cross-section and insertable within the annular space with the apex of the wedge directed toward the axis of the flanged joint and of a size less than the width of the annular space, whereby said apex portion may be readily driven into said annular space.

2. In combination, a flanged joint formed by a pair of connected flanged elements having a sealing ring therebetween whereby the abutting faces of said flanges are spaced apart from each other to provide an annular space circumferentially around the ring, a plurality of arcuate segments of malleable material engaged within the outer portion of said annular space, with each end of each segment having sealing contact with the end of the adjacent segment whereby said segments co-act with each other to completely close the annular space, and a flexible retainer element encircling the arcuate segments and attached thereto, whereby tightening of the flexible element retains the segments in position closing the annular space.

ADAM HENDERSON.

REFERENCES CITED

The following references are of record in the file of this patent:

UNITED STATES PATENTS

| Number | Name | Date |
| --- | --- | --- |
| 1,550,279 | Petrasek | Aug. 18, 1925 |
| 1,585,433 | Sudekum | May 18, 1926 |
| 1,720,563 | Neal | July 9, 1929 |
| 1,864,957 | Stout | June 28, 1932 |
| 1,896,795 | Kendall | Feb. 7, 1933 |
| 2,318,946 | Trickey | Dec. 6, 1938 |
| 2,333,196 | Price | Nov. 2, 1943 |

FOREIGN PATENTS

| Number | Country | Date |
| --- | --- | --- |
| 36,305 | Austria | of 1909 |